United States Patent
Okamoto et al.

(10) Patent No.: US 6,770,357 B2
(45) Date of Patent: Aug. 3, 2004

(54) PRECOATED SKIN MATERIAL FOR AUTOMOBILE INTERIOR PART

(75) Inventors: Hirokazu Okamoto, Nagaokakyo (JP); Masahito Mori, Takatsuki (JP)

(73) Assignees: Sunstar Giken Kabushiki Kaisha, Takatsuki (JP); Unisunstar B.V., Amsterdam (NL)

( * ) Notice: Subject to any disclaimer, the term of this patent is extended or adjusted under 35 U.S.C. 154(b) by 30 days.

(21) Appl. No.: 10/304,068

(22) Filed: Nov. 26, 2002

(65) Prior Publication Data

US 2003/0149174 A1 Aug. 7, 2003

Related U.S. Application Data

(63) Continuation-in-part of application No. 09/542,251, filed on Apr. 3, 2000, now abandoned.

(51) Int. Cl.$^7$ ................................................. B32B 7/12
(52) U.S. Cl. ................................. 428/317.1; 428/317.3; 428/317.7
(58) Field of Search ........................... 428/317.1, 317.3, 428/317.7

(56) References Cited

U.S. PATENT DOCUMENTS 4,404,246 A * 9/1983 Charbonneau et al. ...... 428/212
5,767,188 A * 6/1998 Kamikuri et al. ........... 524/507

FOREIGN PATENT DOCUMENTS

| DE | 2853477 | 6/1980 |
|----|---------|--------|
| EP | 0070168 | 1/1983 |
| EP | 0322138 | 6/1989 |
| EP | 0336744 | 10/1989 |
| EP | 0367165 | 5/1990 |

* cited by examiner

*Primary Examiner*—Bernard Lipman

(74) *Attorney, Agent, or Firm*—Jacobson Holman PLLC

(57) ABSTRACT

A precoated skin material for an automobile interior part comprising (a) a skin material for an automobile interior part and (b) a one-pack type thermally crosslinkable polymer composition comprising (i) a thermoplastic olefinic polymer having a carboxylic acid group or an acid anhydride group, (ii) a latent curing agent, (iii) a carbonyl compound as a solvent and (iv) a tackifier, which composition is coated on the back surface of the skin material, wherein the latent curing agent is a solid polyamine having a melting point of 80 to 200° C. which form hydrolyzable reaction products by a condensation reaction with the carbonyl compound used as the solvent, or a hydrolyzable reaction product of a diamine with a carbonyl compound.

23 Claims, No Drawings

PRECOATED SKIN MATERIAL FOR AUTOMOBILE INTERIOR PART

This application is a Continuation-In-Part application of application Ser. No. 09/542,251 filed Apr. 3, 2000, now abandoned.

BACKGROUND OF THE INVENTION

1. Field of the Invention

The present invention relates to a precoated skin material for an automobile interior part. In particular, the present invention relates to a precoated skin material for an automobile interior part comprising a skin material and a one-pack type thermally crosslinkable polymer composition comprising a specific thermoplastic polymer, a polyamine compound as a latent curing agent and a solvent.

2. Prior Art

As interior parts of automobiles, laminates comprising substrate layers and skin materials laminated on the substrate layers have been used to improve quality. Such a laminate is produced by a vacuum molding or press molding method in which an adhesive is applied to either one or both of the substrate layer and the skin material, and the molding and adhering are performed at the same time.

In such a molding method to adhere the skin material to the surface of the substrate layer by vacuum molding or press molding, a solvent-base adhesive is generally used, which comprises a polyesterpolyurethane containing a polyester as a polyol component dissolved in a solvent. However, this type of an adhesive has insufficient heat resistance required for the use in automobile interior applications, and a two-pack type adhesive containing a polyisocyanate as a curing agent is practically used. Such a two-pack type adhesive has some drawbacks such that it causes the environmental pollution since the adhesive is spray coated in a parts-molding line, and that the working time for mixing, coating and molding/adhering is restricted since two liquid components are reacted on mixing and cured.

SUMMARY OF THE INVENTION

One object of the present invention is to provide a one-pack type thermally crosslinkable polymer composition which can solve the above drawbacks of the conventional adhesives, and which is useful, for example, as an adhesive that is beforehand coated on a back surface of a skin material to provide a precoated skin material in the production of an interior part of an automobile.

Another object of the present invention is to provide a precoated skin material for an automobile interior part, which provides an automobile interior part comprising a substrate layer and a skin material adhered to the surface of the substrate layer, and which has initial heat resistant adhesion properties.

Accordingly, the present invention provides a precoated skin material for an automobile interior part comprising (a) a skin material for an automobile interior part and (b) a one-pack type thermally crosslinkable polymer composition comprising (i) a thermoplastic olefinic polymer having a carboxylic acid group or an acid anhydride group, (ii) a latent curing agent, (iii) a carbonyl compound as a solvent and (iv) a tackifier, which composition is coated on the back surface of said skin material, wherein said latent curing agent is at least one compound selected from the group consisting of solid polyamines having a melting point of 80 to 200° C. which form hydrolyzable reaction products by a condensation reaction with said carbonyl compound used as the solvent, and hydrolyzable reaction products of diamines with carbonyl compounds.

The one-pack type adhesive used in the present invention can be stored at room temperature without the occurrence of a reaction, and crosslinked at a temperature of 60° C. or higher to exert good adhesion strength with good heat resistance.

DETAILED DESCRIPTION OF THE INVENTION

The thermoplastic polymers having a carboxylic acid group or an acid anhydride group may be olefinic polymers, butadiene polymers, ester polymers, carbonate polymers, urethane polymers, amide polymers, etc., all of which have a carboxylic acid group or an acid anhydride group. In particular, olefinic polymers having a carboxylic acid group or an acid anhydride group is preferable from the viewpoint of adhesion properties to polyolefins.

Typical examples of such thermoplastic polymers include polypropylene (PP), styrene-ethylene/butene-styrene copolymers (SEBS), ethylene-vinyl acetate copolymers (EVA), ethylene-acrylate copolymers (EEA), and the like, each of which is modified by the introduction of a dibasic unsaturated acid (e.g. maleic acid, fumaric acid, citraconic acid, mesaconic acid, etc.) or its anhydride. Such modified polymers are known and commercially available.

Hereinafter, thermoplastic polymers having a carboxylic acid group or an acid anhydride group will be referred to as "COOH-modified polymers".

Polyamine compounds used as latent curing agents are divided into the following two classes (I) and (II):

(I) Solid polyamine compounds having a melting point of 60° C. or higher, preferably 80 to 200° C., for example, aromatic polyamines such as 4,4'-diaminodiphenylmethane, 2,4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-tolylenediamine, 2,4-tolylenediamine, 2,5-tolylenediamine, 2,6-tolylenediamine, 3,4-tolylenediamine, etc.; aliphatic polyamines such as 1,12-dodecanediamine, 1,10-decanediamine, 1,8-octanediamine, 1,14-tetradecanediamine, 1,16-hexadecanediamine, etc.; hydrazide base polyamine such as 1,3-bis(hydrazinocarboethyl)-5-isopropylhydantoin of the formula:

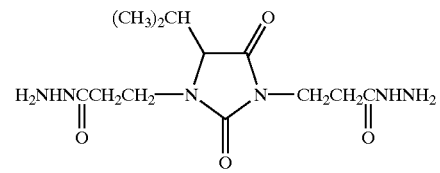

(melting point: 121–123° C.), the compound of the formula: $NH_2NHCO—(CH_2)_{18}—CONHNH_2$ (melting point: 174–181° C.), the compound of the formula: $NH_2NHCO—(CH_2)_6—CH=CH—(CH_2)_2—CH=CH—(CH_2)_6—CONHNH_2$ (melting point: 147–155° C.), the compound of the formula: $NH_2NHCO—(CH_2)_4—CONHNH_2$ (melting point: 177–183° C.), the compound of the formula: $NH_2NHCO—(CH_2)_8—CONHNH_2$ (melting point: 186–188° C.), the compound of the formula: $NH_2NHCO—(CH_2)_{10}—CONHNH_2$ (melting point: 189–191° C.), isophthalic dihydrazide (melting point: 215–225° C.); and the like. These polyamines may be used singly or in admixture of two or more.

An amount of the polyamine compound to be used is at least an equivalent amount to the carboxyl groups of the COOH-modified polymer. When the amount of the polyamine compound is less than the equivalent amount, the crosslinking of the polymer is insufficient, and the heat resistance of the cured material deteriorates. When the amount of the polyamine compound is too large, the curing agent is liberated, so that adherents may be insufficiently adhered. Accordingly, a preferred amount of the polyamine compound to be used is one to 10 times the equivalent amount.

(II) Hydrolyzable reaction products obtained by the reaction of diamines having two amino or imino groups in a molecule, and carbonyl compounds (aldehydes or ketones)

Examples of such diamines include aliphatic diamines (e.g. dimethylaminopropylamine, diethylaminopropylamine, monomethylaminopropylamine, methyliminobispropylamine, hexamethylenediamine, 1,10-diaminododecane, ethylenediamine, propylenediamine, butylenediamine, diethylenetriamine, di-β-aminoethylsulfide, di-β-aminoethyldisulfide, di-β-aminoethylether, di-γ-amino-n-propylether, triglycoldiamine, N,N'-dibutyltrimethylhexamethylenediamine, etc.); alicyclic diamines (e.g. 1,8-p-menhanediamine, isophoronediamine, diaminocyclohexane, 4,4'-methylenebis(cyclohexylamine), 1,3-bisaminomethylcyclohexane, 3-aminomethyl-3,3,5-trimethylcyclohexylamine, N,N'-butylisophoronediamine, N-aminoethylpiperazine, 3-(3-aminopropyl)-3,2-dimethylpiperazine, etc.); aromatic or aromatic aliphatic diamines (e.g. xylylenediamine, diaminodiphenylether, phenylenediamine, triamionxylene, 4,4'-diaminodiphenylmethane, 4,4'-diaminodiphenylpropane, 4,4'-diaminodiphenylether, etc.); and the like. In particular, aliphatic diamines having 8 or more carbon atoms are preferred.

Furthermore, hydrolyzable reaction products can be prepared by reacting the solid polyamines (I) described above with carbonyl compounds.

The above carbonyl compound is generally represented by the formula:

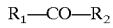

$$R_1\text{—CO—}R_2$$

wherein $R_1$ and $R_2$ are the same or different and represent a hydrogen atom, a lower alkyl group having 1 to 8 carbon atom, preferably 1 to 6 carbon atoms (e.g. a methyl group, an ethyl group, a n-propyl group, an isopropyl group, a n-butyl group, an isobutyl group, a tert.-butyl group, etc.), a phenyl group or a naphthyl group, or $R_1$ and $R_2$ together form a cyclic hydrocarbon group (e.g. a cyclohexyl group or a cyclopentyl group, etc.), provided that $R_1$ and $R_2$ are not hydrogen atoms or naphthyl groups at the same time.

Specific examples of the carbonyl compound include aliphatic aldehydes (e.g. acetaldehyde, propionaldehyde, n-butylaldehyde, isobutylaldehyde, diethylacetoaldehyde, etc.), aromatic aldehydes (e.g. benzaldehyde, etc.), cyclic ketones (e.g. cyclopentanone, trimethylcyclopentanone, cyclohexanone, trimethylcyclohexanone, etc.), aliphatic ketones (e.g. acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone, etc.); and the like.

The diamine and the carbonyl compound may be reacted under conventional conditions. For example, the diamine and an equivalent or excessive amount of the carbonyl compound in relation to the diamine are reacted in a suitable solvent (e.g. toluene, xylene, benzene, etc.), optionally in the presence of a water absorbent (e.g. molecular sieves, anhydrous magnesium sulfate, etc.) at room temperature or an elevated temperature while removing water.

Alternatively, the carbonyl compound may be added to the diamine subsequently. The reaction of the solid polyamine with the carbonyl compound thermally proceeds gradually during storage at room temperature resulting in the increase of the viscosity of the crosslinkable polymer composition. In such a case, when the carbonyl compound is used as a solvent, the increase of the viscosity of the composition is suppressed so that the shelf stability of the crosslinkable polymer composition is improved. Since the hydrolyzable reaction product is formed through the dehydration condensation reaction of the amino group and/or the imino group of the polyamine compound or the diamine compound with the carbonyl compound, the amino group and/or the imino group of the polyamine compound or the diamine compound do not cause the crosslinking reaction with the carboxyl group or the acid anhydride group of the crosslinkable polymer.

Here, a reaction product obtained using an aldehyde as a carbonyl compound is referred to as "aldimine", while one obtained using a ketone as a carbonyl compound is referred to as "ketimine".

Ketimines are usually less stable and more easily hydrolyzed than aldimines. That is, aldimines having a relatively low molecular weight have good shelf stability, while ketimines having a low molecular weight are unstable. Thus, solid polyamines and solid diamines having a relatively high molecular weight and good stability (low activity) are preferably used to prepare ketimines. More preferably, a reaction medium, which functions also as a carbonyl compound, is used, since the reaction is always in an equilibrium state.

An amount of the aldimine or the ketimine may be at least an equivalent amount to the carboxyl groups of the above COOH-modified polymer. When the amount of the aldimine or the ketimine is less than the equivalent amount, the degree of crosslinking is insufficient, and thus the cured carboxyl-modified polymer of the composition has low heat resistance. When the amount of the aldimine or the ketimine is too excessive, the adherents may be insufficiently adhered. Accordingly, a preferred amount of the polyamine to be used is one to 10 times the equivalent amount.

Examples of the carbonyl compound to be used as a solvent in the one-pack type thermally crosslinkable polymer composition of the present invention includes aldehydes and ketones. Specific examples of aldehyes are acetaldehyde, propionaldehyde, butylaldehyde, isobutylaldehyde, valeraldehyde, isovaleraldehyde, pivalaldehyde, capronaldehyde, heptaldehyde, caprylaldehyde, etc. Specific examples of ketones are acetone, methyl ethyl ketone, pentanone, hexanone, methyl isobutyl ketone, heptanone, diisobutyl ketone, acetonylacetone, mesityl oxide, phorone, isophorone, cyclohexanone, methylcyclohexanone, etc.

The carbonyl compound may be used in combination with other solvents such as aromatic solvents (e.g. toluene, xylene, benzene, etc.), cyclic alkanes (e.g. cyclohexane, etc.), halogenated hydrocarbons (e.g. 1,1,1-trichloroethane, methylene chloride, etc.), etc.

The carbonyl compound as a solvent may be used in an amount of at least 2% by weight provided that the thermoplastic polymer is not made insoluble, preferably from 5 to 15% by weight, based on the weight of the thermoplastic polymer. The carbonyl compound is usually used in an amount of 10 to 1,000 times equivalent to one equivalent of the latent curing agent.

The carbonyl compound to be used as the solvent in the composition of the present invention dehydration condensation reacts with the amino group and/or the imino group of the solid polyamine or the hydrolyzable reaction product to be used as the latent curing agent to form the hydrolyzable reaction product. As a result, the crosslinking reaction of the COOH-modified polymer having a carboxyl group or an acid anhydride group with the amino group and/or the imino group of the solid polyamine or the hydrolyzable reaction product is suppressed, and thus the shelf stability of the composition is improved. Furthermore, the storage stability of the precoated skin material carrying the beforehand coated adhesive is also improved. In addition, the adhesion properties, in particular, heat resistant adhesion properties is improved when the precoated skin material is vacuum adhered by heating to the substrate layer.

When the amount of the carbonyl compound is less than 2% by weight, the viscosity of the composition increases. When the amount of the carbonyl compound exceeds 15% by weight, the solubility of the COOH-modified polymer may decrease.

The one-pack type thermally crosslinkable polymer composition of the present invention preferably comprises the COOH-modified polymer, the solid polyamine (I) or the aldimine or ketimine (II), which are dispersed in the above specific ratio in the carbonyl compound as the suitable organic solvent. If desired, the one-pack type thermally crosslinkable polymer composition of the present invention may optionally contain a conventional thermoplastic resin (e.g. acrylic resin, vinyl resin, polyamide resin, polyester resin, polyolefin, polyurethane, SEBS, etc.), tackifiers, polyolefin-base tackifiers, dyes, pigments, etc.

The one-pack type thermally crosslinkable polymer composition of the present invention having the above composition can be used as an adhesive, a coating material, an adhesive sheet, a film or sheet-form adhesive, a paint, and the like. In particular, the one-pack type thermally crosslinkable polymer composition of the present invention is useful as an adhesive which is used in the production of laminates for automobile interior parts, which comprise a substrate layer (e.g. ABS boards, polyphenylene oxide (NORYL®) boards, ASG boards, polycarbonate boards, polypropylene boards, wood composite boards, steel plates, etc.) and skin materials (e.g. polyvinyl chloride foams, polyolefin foams such as polyethylene foams, polypropylene foams, etc.).

One example of the skin material is described by Makoto Ohyama et al, "Solvent-Free Adhesive Technology for Instrument Crash Pad Vacuum Forming", International Congress and Exposition, Detroit, Mich., Feb. 27-Mar. 2, 1995 (SAE International). This literature describes a laminate skin material having a polyvinyl chloride sheet and a polypropylene foam. Furthermore, the skin material may be a polymer sheet or a laminate of a polymer sheet and a polymer foam laminated on the back surface of the polymer sheet. The polymer sheet is preferably a polyolefin sheet, in particular, a polypropylene sheet.

The thermally crosslinkable polymer of the present invention is usually applied to the back surface of the skin material, that is, the surface which faces the substrate layer.

The production steps of such laminates will be explained in detail.

i) Firstly, the polymer composition of the present invention is precoated in a thickness of 5 to 500 μm uniformly on the back surface of a skin material, and dried at a temperature of room temperature to 100° C., for example, 50 to 100° C. for several seconds to several minutes. The dry thickness of the composition is from 10 to 300 μm.

Alternatively, the polymer composition of the present invention may be discontinuously coated on the back surface of a skin material. For example, the polymer composition may be coated in a linear (or bead) form or a dot form. In the case of discontinuous coating, the amount of the polymer composition can be reduced to about half to two thirds of the amount in the case of the overall area coating. The polymer composition may be discontinuously applied with a multi-nozzle, or transferred with a roll or a doctor knife coater By the above application methods, an adhesive layer having no blocking properties is formed on the skin material. The precoated skin material may be supplied to a following molding process as such, or it may be stored for a certain time, for example, several months at a temperature of room temperature to 50° C. and then supplied to the molding process. Even when the precoated skin material is stored for a long time, it can exert a sufficient adhesion force.

When a latent curing agent in the adhesive layer of the precoated skin material is the aldimine or the ketimine, it tends to be easily hydrolyzed with moisture (or water) in an air to form a free amine and to cause the hydrolysis. Thus, the precoated skin material should be stored in a dry state in a sealed container during the storage or in the period prior to molding in a subsequent step.

ii) Then, the precoated skin material produced in the step i) is laminated on a substrate heated at a specific temperature (usually around 60° C.) while optionally heating the skin material at a certain temperature (usually from 100 to 180° C.), if desired, and heat pressed under a pressure of 0.1 kg/cm² or more for at least 10 seconds to effect the molding and adhering at the same time. Thus, a laminate having good heat resistant adhesion properties. In addition, such a molding process can prevent environmental pollution caused by the evaporation of solvents.

Such laminates can be used as automobile interior parts such as inside trims (e.g. door trims, front pillars, deck side trims, center pillars, etc.), instrument panels, molded ceilings, console boxes, and the like.

In the above, the polymer composition of the present invention is explained in connection with its application as a precoating adhesive of skin materials, that is, an adhesive which is beforehand coated on skin materials, although it can be advantageously used as a thermally crosslinkable adhesive film, sheet or tape having a thickness of 50 to 500 μm by forming, that is, coating and drying, the composition on a suitable support such as a release paper. In such a case, the properties of the film may be adjusted by the addition of the above-described thermoplastic resins.

EXAMPLES

The present invention will be explained further in detail by following Examples, which do not limit the scope of the invention.

Examples 1–3 and Comparative Examples 1 and 2

1) Preparation of Adhesive

A COOH-modified polymer, a thermoplastic resin, a tackifier and a solid polyamine compound shown in Table 1 were added to and dispersed in a mixed solvent of xylene, cyclohexane and methyl isobutyl ketone (weight ratio of 45:45:10) by mixing at 60° C. for 2 hours to obtain a composition.

With the prepared composition, the blocking tendency was evaluated as follows. The result is shown in Table 1.

Blocking Tendency

The composition was coated on a face of a polypropylene foam (PPF) laminated with a thermoplastic polypropylene sheet layer (TPO), and dried at 60° C. for 5 minutes. Then, a pair of dried precoated skin materials (TPO/PPF/composition) were laminated with the composition layer of one skin material facing the TPO of the other and kept standing at 60° C. for 72 hours while applying a load of 0.5 kg/cm². Immediately thereafter, the upper skin material was lifted up, and the blocking state was observed, and ranked as follows:

O: The skin materials were not blocked, and the lower skin material was not lifted up together.

X: The skin materials were blocked, and the skin materials were lifted up together.

2) Production of Laminated Molded Article and Evaluation of Composition

The composition prepared in the above step 1) was coated in a thickness of 500 μm on a face of a polyethylene foam of a skin material having a thickness of 3 mm, and dried at 60° C. for 5 minutes to obtain a precoated skin material.

Then, the precoated skin material was heated to a temperature of 120 to 130° C. with a far infrared heater and laminated on a polypropylene board as a substrate which had been heated at 80° C. for 2 minutes, followed by compressing under a load of 0.5 kg/cm² for 20 seconds to obtain a laminated molded article.

With the produced laminated molded article, an initial creep, an initial peel strength and heat resistant creep were measured under the following conditions Initial Creep Immediately after the production of the molded article, a load of 200 g/25 mm was applied in the 90 degree angle direction in an atmosphere of 60° C. After 5 minutes, the peeled length (mm) was measured. A peeled length of 5 mm or less is satisfactory.

Initial Peel Strength

A peel strength was measured after 5 minutes from the completion of the lamination.

Heat Resistant Creep

After keeping the laminated molded article at 20° C. for 24 hours, a load of 200 g/25 mm was applied in the 90 degree angle direction in an atmosphere of 90° C. After 24 hours, the peeled length (mm) was measured.

The results are shown in Table 1, in which "CF" stands for cohesive failure, and "MB" stands for the breakage of the foam layer of the skin material. In Comparative Example 2, the composition was gelled in the course of the preparation. Thus, no test was carried out.

TABLE 1

|  | Example No. | | | C. Ex. No. | |
|---|---|---|---|---|---|
|  | 1 | 2 | 3 | 1 | 2 |
| Maleic anhydride-modified pp[1] | 100 | — | — | 100 | 100 |
| Maleic anhydride-modified SEBS[2] | — | 100 | — | — | — |
| COOH-modified PB[3] | — | — | 100 | — | — |
| SEBS[4] | 20 | 20 | 20 | 20 | 20 |
| Tackifier[5] | 100 | 100 | 100 | 100 | 100 |
| Hydrazide-base polyamine[6] | 30 | 30 | 30 | — | — |
| Hexamethylene diamine (melting point: 39–42° C.) | — | — | — | — | 15 |
| Mixed solvent | 700 | 700 | 700 | 700 | 700 |
| Blocking tendency | O | O | O | X | — |

TABLE 1-continued

|  | Example No. | | | C. Ex. No. | |
|---|---|---|---|---|---|
|  | 1 | 2 | 3 | 1 | 2 |
| Initial creep (mm) | 3 | 4 | 4 | 30 | — |
|  | CF | CF | CF | CF |  |
| Initial peel strength (kg/25 mm) | 2.3 | 2.2 | 2.2 | 2.3 | — |
|  | MB | MB | MB | MB |  |
| Heat resistant creep (mm) | 0 | 0 | 0 | Fall | — |

Notes:
[1] MTPP (trade name) manufactured by TOYO KASEI Co., Ltd.
[2] TOUGHTECK (trademark) N-1953 manufactured by Asahi Chemical Industry Co., Ltd.
[3] M-2000-80 (trade name) manufactured by NIPPON PETROCHEMICAL CO., LTD.
[4] TOUGHTECK (trademark) H-1042 manufactured by Asahi Chemical Industry Co., Ltd.
[5] NEOPOLYMER 140 manufactured by NIPPON PETROCHEMICAL CO., LTD.
[6] 1,3-Bis (hydrazinocarboethyl)-5-isopropylhydantoin (melting point: 120–123° C.)

Example 4

A laminated molded article was prepared in the same manner as in Example 1 except that the polymer composition was coated on a face of a polyethylene foam of a skin material as follows:

Overall coating:
The polymer composition was spray coated on the polypropylene foam side of the skin material to a thickness of 650 g/m² (dry thickness of 100 μm), and dried at 60° C. for 5 minutes to obtain a precoated skin material.

Bead coating:
1. The polymer composition was coated in the form of a bead having a diameter of about 2 mm in an amount of a half of the coated amount in the case of the 100 μm dry thickness.
2. The polymer composition was coated in the form of a bead having a diameter of about 4 mm in an amount of two thirds of the coated amount in the case of the 100 μm dry thickness.

Dot coating:
1. The polymer composition was coated in the form of a square having a side of 4 mm in an amount of a half of the coated amount in the case of the 100 μm dry thickness.
2. The polymer composition was coated in the form of a square having a side of 8 mm in an amount of two thirds of the coated amount in the case of the 100 μm dry thickness.

Then, the initial creep, initial peel strength and heat resistant creep were measured in the same manner as in Example 1. The results are shown in Table 2.

TABLE 2

|  | Overall coating | Bead coating (lateral)[1] | | Dot coating | |
|---|---|---|---|---|---|
|  |  | ½ | ⅓ | ½ | ⅔ |
| Initial creep (mm) | 2 | 2 | 4 | 10 | 2 |
|  | CF | CF | CF | CF | CF |
| Initial peel strength (kg/25 mm) | 5.1 | 4.7 | 5.5 | 4.5 | 6.7 |
|  | MB | MB | MB | MB | MB |

TABLE 2-continued

|  | Overall coating | Bead coating (lateral)[1] | | Dot coating | |
|---|---|---|---|---|---|
|  |  | 1/2 | 1/3 | 1/2 | 2/3 |
| Heat resistant creep (mm) | 0 | 1.3 | 4 | Fall | 0 |

Note:
[1]"Bead coating (lateral)" means that the creep was in the direction perpendicular to the coating direction of beads.

An amount of the coated polymer composition can be decreased while keeping the good adhesion properties when it is discontinuously coated.

Examples 5 and 6

1) Preparation of Adhesive

The components shown in Table 3 were mixed and dispersed in the same manner as in Example 1 to obtain an adhesive.

The aldimine and the ketimine used in these Examples were prepared as follows:

Preparation of Aldimine

In a reactor vessel replaced with nitrogen gas, hexamethylenediamine (50 wt. parts), a water-absorbent (molecular sieve) (90 wt. parts) and absolute toluene (50 wt. parts) were charged. Then, benzaldehyde (100 wt. parts) was gradually added to the stirred mixture and reacted while cooling at 10° C.

Preparation of Ketimine

In a reactor vessel replaced with nitrogen gas, 1,10-diaminododecane (50 wt. parts), acetone (100 wt. parts) and a water-absorbent (molecular sieve) (70 wt. parts) were charged at once and reacted.

2) Production of Laminated Molded Article and Evaluation of Adhesion

An adhesive was coated in the thickness of 500 μm on the PPF (polypropylene foam) side laminated with TPO, which was used in the above evaluation of the blocking tendency, and dried at 60° C. for 5 minutes to obtain a precoated skin material. Then, the precoated skin material was kept in a sealed container.

The precoated skin material was taken out of the container one day before the use, and maintained at room temperature to effect the hydrolysis of the adhesive. Then, the precoated skin material was laminated on a polypropylene board, which had been heated at 80° C. for 2 minutes, under a load of 0.5 kg/cm² for 20 seconds while heating the skin material at 120 to 130° C. to obtain a laminate. The results of the same adhesion property tests as those in Examples 1–3 are shown in Table 3.

TABLE 3

|  | Example No. | |
|---|---|---|
|  | 5 | 6 |
| Maleic anhydride-modified PP | 100 | 100 |
| SEBS | 20 | 20 |
| Tackifier | 100 | 100 |
| Aldimine | 30 | — |
| Ketimine | — | 30 |
| Mixed solvent | 700 | 700 |
| Blocking tendency | 0 | 0 |
| Initial creep (mm) | 2 CF | 2 CF |

TABLE 3-continued

|  | Example No. | |
|---|---|---|
|  | 5 | 6 |
| Initial peel strength (kg/25 mm) | 2.2 MB | 2.3 MB |
| Heat resistant creep (mm) | 0 | 0 |

From the above results, the polymer compositions of the present invention prepared in Examples 1 to 6 have good initial adhesion strength, and heat resistant adhesion strength.

What is claimed is:

1. A precoated skin material for an automobile interior part comprising (a) a skin material for an automobile interior part and (b) a one-pack type thermally crosslinkable polymer composition comprising (i) a thermoplastic olefinic polymer having a carboxylic acid group or an acid anhydride group, (ii) a latent curing agent, (iii) a carbonyl compound as a solvent and (iv) a tackifier, which composition is coated on the back surface of said skin material, wherein said latent curing agent is at least one compound selected from the group consisting of solid polyamines having a melting point of 80 to 200° C. which form hydrolyzable reaction products by a condensation reaction with said carbonyl compound used as the solvent, and hydrolyzable reaction products of diamines with carbonyl compounds.

2. The precoated skin material according to claim 1, wherein said thermoplastic olefinic polymer having a carboxylic acid group or an acid anhydride group is polypropylene or a styrene-ethylene/butene-styrene copolymer, which is modified with maleic anhydride.

3. The precoated skin material according to claim 1, wherein at least a part of said polyamine compound is present in the form of a hydrolyzable reaction product obtained by the reaction with said carbonyl compound used as the solvent.

4. The precoated skin material according to claim 1, wherein said polyamine compound is a hydrolyzable reaction product obtained by the reaction of a diamine having two amino or imino groups in a molecule, and a carbonyl compound selected from the group consisting of aldehydes and ketones.

5. The precoated skin material according to claim 4, wherein at least a part of said polyamine compound is present in the form of a hydrolyzable reaction product obtained by the reaction with said carbonyl compound used as the solvent.

6. The precoated skin material according to claim 4, wherein said hydrolyzable reaction product is a reaction product obtained by the reaction of an aliphatic diamine and an aromatic aldehyde.

7. The precoated skin material according to claim 4, wherein said hydrolyzable reaction product is a reaction product obtained by the reaction of an aliphatic diamine having at least 8 carbon atoms and an aliphatic ketone.

8. The precoated skin material according to claim 1, wherein the one-pack type thermally crosslinkable polymer composition is discontinuouly coated on the back surface of said skin material.

9. The precoated skin material according to claim 6, wherein the one-pack type thermally crosslinkable polymer composition is coated on the back surface of said skin material in the linear form or a dot form.

10. The precoated skin material according to claim 8, wherein the applied amount of the one-pack type thermally crosslinkable polymer composition is half to two thirds of an amount in the case of overall area coating.

11. An automobile interior part comprising a polyolefin substrate and a precoated skin material for an automobile interior part which is adhered to the surface of said polyolefin substrate, wherein said precoated skin material comprises (a) a skin material for an automobile interior part and (b) a one-pack type thermally crosslinkable polymer composition consisting essentially of (i) a thermoplastic olefinic polymer having a carboxylic acid group or an acid anhydride group, (ii) a latent curing agent, (iii) a carbonyl compound as a solvent and (iv) a tackifier, which composition is coated on the back surface of said skin material, wherein said latent curing agent is at least one compound selected from the group consisting of solid polyamines having a melting point of 80 to 200° C. which form hydrolyzable reaction products by a condensation reaction with said carbonyl compound used as the solvent, and hydrolyzable reaction products of diamines with carbonyl compounds.

12. The automobile interior part according to claim 11, wherein said thermoplastic olefinic polymer having a carboxylic acid group or an acid anhydride group is polypropylene or a styrene-ethylene/butene-styrene copolymer, which is modified with maleic anhydride.

13. The automobile interior part according to claim 11, wherein said polyamine compound is a hydrolyzable reaction product obtained by the reaction of a diamine having two amino or imino groups in a molecule, and a carbonyl compound selected from the group consisting of aldehydes and ketones.

14. The automobile interior part according to claim 13, wherein said hydrolyzable reaction product is a reaction product obtained by the reaction of an aliphatic diamine and an aromatic aldehyde.

15. The automobile interior part according to claim 13, wherein said hydrolyzable reaction product is a reaction product obtained by the reaction of an aliphatic diamine having at least 8 carbon atoms and an aliphatic ketone.

16. The automobile interior part according to claim 11, wherein the one-pack type thermally crosslinkable polymer composition is discontinuouly coated on the back surface of said skin material.

17. The precoated skin material according to claim 16, wherein the one-pack type thermally crosslinkable polymer composition is coated on the back surface of said skin material in the linear form or a dot form.

18. The precoated skin material according to claim 16, wherein the applied amount of the one-pack type thermally crosslinkable polymer composition is half to two thirds of an amount in the case of overall area coating.

19. A method of making the precoated skin material of claim 1 comprising applying the one-pack type thermally crosslinkable polymer composition to the back surface of the skin material.

20. The method according to claim 19, wherein the one-pack type thermally crosslinkable polymer composition is discontinuously applied on the back surface of said skin material.

21. The method according to claim 20, wherein the one-pack type thermally crosslinkable polymer composition is applied on the surface of the skin material in a linear form or a dot form.

22. The method according to claim 20, wherein the applied amount of the one-pack type thermally crosslinkable polymer composition is half to two thirds of an amount in the case of overall area coating.

23. A laminated molded article for an automobile interior part, comprising a substrate layer, and the precoated skin material according to claim 1 which is adhered to the surface of said substrate layer by vacuum molding or press molding.

* * * * *